US007122986B1

(12) United States Patent
Willard et al.

(10) Patent No.: US 7,122,986 B1
(45) Date of Patent: Oct. 17, 2006

(54) MOTOR OPERATOR SYSTEM FOR A POWER SWITCH

(75) Inventors: Frank G. Willard, Oakmont, PA (US); Joseph K. Andreyo, North Huntingdon, PA (US); Angelo Rometo, New Stanton, PA (US); John R. Klinvex, North Huntingdon, PA (US)

(73) Assignee: Cleaveland/Price Inc., Trafford, PA (US)

( * ) Notice: Subject to any disclaimer, the term of this patent is extended or adjusted under 35 U.S.C. 154(b) by 599 days.

(21) Appl. No.: 10/348,383

(22) Filed: Jan. 21, 2003

(51) Int. Cl.
*H02P 1/04* (2006.01)

(52) U.S. Cl. ...................... 318/468; 318/266; 318/286; 318/369; 318/467; 307/147

(58) Field of Classification Search ................ 318/138, 318/254, 439, 460–469, 266, 286, 369
See application file for complete search history.

(56) References Cited

U.S. PATENT DOCUMENTS

| | | | | |
|---|---|---|---|---|
| 3,046,864 A * | 7/1962 | Batterman et al. | 355/101 |
| 3,582,741 A * | 6/1971 | Arnold et al. | 318/759 |
| 3,925,722 A | 12/1975 | Fohrhaltz et al. | |
| 4,179,646 A | 12/1979 | Russell | |
| 4,357,505 A | 11/1982 | Bridges | |
| 4,691,148 A * | 9/1987 | Nicholls et al. | 318/12 |
| 4,804,809 A | 2/1989 | Thompson, Jr. et al. | |
| 4,914,368 A | 4/1990 | Orton | |
| 5,025,171 A | 6/1991 | Fanta et al. | |
| 5,321,980 A | 6/1994 | Hering et al. | |
| 5,552,647 A | 9/1996 | Tinkham | |
| 5,804,930 A | 9/1998 | Panto | |
| 5,856,642 A | 1/1999 | Sanders | |
| 6,025,657 A | 2/2000 | Lo et al. | |
| 6,075,688 A | 6/2000 | Willard et al. | |
| 6,215,263 B1 * | 4/2001 | Berkowitz et al. | 318/272 |
| 6,378,222 B1 | 4/2002 | Enzinna | |
| 6,456,025 B1 * | 9/2002 | Berkowitz et al. | 318/272 |

OTHER PUBLICATIONS

Cleaveland/Price Inc., Bulletin DB32A01 (of 2001), "UAD™ Controller for Underground Motor Operated Switches".
Thomas & Betts, Cat. No. C-MVS-UAD, Oct. 2001, "Elastimold® MVS Molded Vacuum Switch with Underground Automated Distribution Controller".
Cleaveland/Price Inc., Bulletin DB-128C01 (of 2001), "Types BR, BR-T, BT-D, BT-T, and BT-TF Motor Operators for Transmission and Distribution Automation".

* cited by examiner

*Primary Examiner*—Lincoln Donovan
*Assistant Examiner*—Tyrone Smith
(74) *Attorney, Agent, or Firm*—Gordon H. Telfer

(57) ABSTRACT

A motor and a rotary potentiometer, or other position sensor, running on the motor shaft are mounted in a first enclosure with an output shaft for driving a power switch open or closed. A part of the system outside the first enclosure makes use of a motor position signal from the rotary potentiometer that is processed by a microcontroller that a worker can interact with at a switch panel to set and adjust motor travel limits without needing access into the motor enclosure. The first enclosure and its components can be used for various applications, including those for either underground or pad-mounted switches, which for the latter case can have the first enclosure inside a second enclosure on a pad, and the second enclosure also contains other power and control elements of the system. A portable unit with the switch panel for travel limits can be provided. Other features include a slip clutch, for running a rotary potentiometer from the motor shaft, an overspeed brake of one or more voltage suppressor elements for limiting the speed at which the motor can be turned during a manual switch operation, and a compact, economical structure of the first enclosure.

63 Claims, 5 Drawing Sheets

MOTOR OPERATOR SYSTEM FOR A POWER SWITCH

BACKGROUND OF THE INVENTION

1. Field of the Invention

The invention relates to motor operators, such as for power switches of electrical utilities, and particularly to such operators for underground switches as well as switches in other locations, with a drive and control system that allows remote adjustment of motor travel settings and other features facilitating their construction and operation.

2. Background Art

Power switches, for example, disconnect and load break switches for distribution systems, are typically used in three main types of locations: overhead on a utility pole, in an underground vault, and pad mounted substantially at surface level. (Reference to "pad" or "pad mounted" herein, unless the context clearly indicates the contrary, is to be understood as mounted on an above ground pad. It is of course the case that underground switches are sometimes mounted on a pad also.) The switches can also be of different types. Unenclosed air break switches are often used on pole top installations. Enclosed, but not sealed, air break switches are often used at pad mounted installations. Enclosed and sealed switches, such as with vacuum or gas (e.g., SF6) insulation, are often used in locations, such as underground vaults, where the confined and sometimes flooded space makes them preferred to air break switches.

Switches in underground locations, and also in some pad installations, have motor operators located near the switches (in contrast, for example, to poletop air break switches that are mechanically coupled to motor operators on or near the ground). At one time power switches could be operated only by direct access to the switch or its operator. More recently, the power switch art has applied technology for remote, automated, operation of a motor operator to close and open a power switch, (see, for example, Cleaveland/Price Bulletin DB-128C01 (of 2001), and also, U.S. Pat. No. 6,075,688, Jun. 13, 2000, herein incorporated by reference, for background information on automated motor operators). Sometimes, however, a motor operator will need some adjustment performed at the motor operator itself.

Extra danger to utility workers is encountered in tight locations such as underground vaults. For example, an enclosed switch may explode, due to heat buildup from arcing, and subject workers to injury.

Motor operators for underground switch locations generally require a sealed enclosure. For access to the interior of the enclosure, it has been necessary to have a port or panel of the enclosure that is removable and replaceable at the service location by a worker. In addition to the time needed to access the interior and to reseal the motor operator properly, perhaps dealing with up to thirty fasteners and a gasket, there is a risk the attempt to reseal is not successful and can lead to malfunction of the unit. The worker performing the field work is not equipped to test whether the seal is effective.

In the past, underground motor operators, and most others, required adjustment at the motor operator-power switch location to set the limits of travel of the motor in the motor operator which determine the travel limits of the power switch. For proper operation the motor drive unit (i.e., the motor itself and related gearing) needs to be able to move the power switch contacts to a definite closed position or a definite open position. Otherwise the function of the switch is impaired and, possibly, the motor of the drive or the mechanical coupling to the switch is damaged by being driven until the motor stalls.

For final adjustment during installation and occasional readjustment over the life of the equipment, in the case of an underground switch, a worker would have to enter the vault where the switch and motor operator are located. Typically, limit switches to control the limits of travel of the motor operating shaft would need setting upon initial installation of the operator and switch and possible adjusting from time to time after installation. The limit switches would have to be accessed by opening up the enclosure containing the motor resulting in the risks mentioned above in the case of underground units, including at least the risk to the integrity of the seal of the enclosure. While other locations, such as pad mounted at ground level, do not involve quite the same concerns for worker safety and motor operator integrity, the need for accessing limit switches is at least an undesirable maintenance requirement.

Motor operators have been used or proposed having a switch actuator with a position-sensing feature between an output shaft of the motor of the operator and a lever that produces power switch opening or closing, for example, as in U.S. Pat. No. 5,552,647, Sep. 3, 1996. Position sensing is shown by a potentiometer responsive to movement of a linear actuator to generate a signal indicating a position of a reference element on the actuator. The signal generated is communicated to control circuitry. The circuitry compares the signal to a standard to determine if the actuator travel is within limits determined by adjustable open-limit and closed-limit potentiometers. The arrangement is intended to improve on prior limit switch assemblies which fail to provide sufficient accuracy and repeatability and tend to be overly complicated and costly.

Such an actuator control is not one that avoids need for adjustment in the motor operator enclosure. The enclosure has an access hole specifically for adjustment of the open-limit potentiometer and the close-limit potentiometer.

Other motor operators have been disclosed that also have a sensed position signal. U.S. Pat. No. 6,025,657, Feb. 15, 2000, is directed to a motor operator for either power or manual operation without need for any decoupling or mode selection with a control system that receives signals indicating both the position of the drive output and the current drawn by the drive source. U.S. Pat. No. 6,215,263, Apr. 10, 2001, discloses a motor operator for overhead air break switches with a microcontroller subject to a variety of signals, including a position signal developed by a sensor that is a type of encoder. Some of the parameters relied on are temperature sensitive and require compensation. Some types of shaft position sensors, for example, including some encoders, depend on continuous power for a position signal to be reliably generated. Otherwise, after a power outage, the actual switch position would need to be observed and the motor travel limits reset. Such prior art has not particularly addressed and responded to a desire in the power switch art for avoiding needed travel limit adjustments in the enclosure of the motor, particularly important in underground sealed units, in a system not requiring multiple sensed signals and, also, easy to implement and operate.

Switches on motor operators are subject to manual operation under various circumstances. The power normally is off for a manual operation of the switch. Unless the motor is decoupled from the switch and only the switch is operated during a manual operation, there is a risk that the motor is caused to rotate at such high speed, i.e., an overspeed, that the motor is damaged (particularly its windings). Normally that risk is avoided by selecting a motor in the original manufacture that is heavy and strong enough, which of course incurs size and cost drawbacks. Similarly, any other component running off the motor shaft has to be rugged enough to withstand force that is transmitted by the shaft rotation during any operation.

SUMMARY OF THE INVENTION

This invention, in its various aspects, includes a number of features that each contribute to an innovative motor operator system, particularly for, but not limited to, use with underground switches. While individual features are combined in certain embodiments, it is not necessary to practice all the improvements together or to achieve all the characteristics of the preferred embodiments.

In the innovative system, in some embodiments, a first enclosure houses a motor with a gear train for driving a shaft coupled to a power switch, which can be adjacent to it in an underground vault, with also a position sensor such as a potentiometer, preferably a rotary potentiometer, in the first enclosure that runs off the motor shaft. The rotary potentiometer (or "pot", for simplicity) develops a voltage signal indicating the rotary position of the motor shaft. The motor operator system has a second enclosure for power supply and control elements that, in the case of an underground switch, is much more accessible, such as being at surface level, than the enclosure in the underground vault. The second enclosure can provide various automation functions, such as for remote switch operation via a radio and RTU, and also provide for local operation at the second enclosure.

The position signal from the pot is communicated to a microcontroller in the second enclosure that has a nonvolatile memory for storing motor travel limits. A worker at the second enclosure can perform various functions at the second enclosure while merely observing or hearing the switch open or close, such as through a manhole without need to enter the vault where the switch and the first enclosure have been installed. Furthermore, even after a total power outage, including lack of any back-up battery power, when the pot is re-energized an accurate signal of the current switch position is given to the controller.

With the use of a switch panel in the second enclosure that receives the position signals, the worker can open or close the switch, set an existing position as a set point, and adjust the set points of travel that the motor moves between OPEN and CLOSE switch positions. Software running on the microcontroller controls all of these user functions. While numerous control features can be implemented to vary how the motor runs, in one embodiment simply using the position signal while selectively running the motor fully on for travel in the open or closed switch direction allows a worker to set or adjust travel limits accurately. The only needed signal from the motor to the controller is the shaft position signal.

Consequently, in embodiments as described above, the motor operator system is in two principal segments: one near the switch that includes the motor, gearing, and the pot and the other with power and control, including a position switch panel for travel settings, at a convenient location not near enough to the switch to raise worker safety concerns.

In some embodiments, such a switch panel is in a portable unit that a worker can remove from an underground switch vault for hand-held use above ground.

The motor-gearbox of the motor operator system can be of various structural elements to meet the mechanical requirements of the particular switch with which it is used. In one aspect, the invention opens up opportunities for a motor operator design engineer to select a motor for a particular application from a wider range of possible size and ruggedness. The ability to use a small, lightweight, motor is a definite plus for underground installations and can be desirable in others as well. Such a motor also can be desirable to achieve effective performance more economically than a bigger, stronger motor.

According to one aspect of the present invention, the risk of damage to the motor as a result of an overspeed condition during a manual operation is avoided by an overspeed limiting circuit (or overspeed brake circuit) that is effective even when the motor is de-energized.

The overspeed limiting circuit includes a bidirectional voltage suppressor (performing speed limiting in both directions of shaft rotation) connected across the motor, specifically its rotating armature, that allows free motor movement until the motor turns at a speed great enough to generate a voltage across the armature that reaches a threshold at which the suppressor conducts current and clamps the voltage. When this occurs, the motor braking force is sufficient to discourage further speed increase from manual operation thereby avoiding damage to the motor.

The overspeed limiting circuit is designed to operate at a threshold or clamping voltage above the normal operating voltage so it does not interfere with operation under power. The clamping voltage is chosen, however, to be at a level below that resulting from an overspeed condition that would damage the motor.

The overspeed limiting circuit can be provided for different types of motors including, for example, permanent magnet motors and reversible DC shunt wound motors.

Another aspect of the invention allows a design engineer to select a rotary potentiometer, for sensing motor shaft position, that is small, lightweight, and economical because it is protected against overtensioning from motor forces by a slip clutch. The slip clutch can be of various constructions including those without electromagnetic field assemblies or the like. In one form, a slip clutch, located directly between the shaft from the motor and the rotary element of the pot, comprises a number of o-rings that allow motor shaft rotation to be transferred to the rotary potentiometer while limiting tension on the potentiometer. Long life and high accuracy can be obtained even with a relatively light and inexpensive pot, with the slip clutch adding little cost. Further, the design of the o-ring slip clutch allows easy variation, in terms of the number and size of the o-rings, to facilitate adapting the basic design to a particular motor-potentiometer combination.

Another aspect of the invention is that the design of a motor operator system including the preferred features for underground switches is also readily adapted to other types of installations. As mentioned in the background, overhead, underground, and pad-mounted switches are widely used in utility systems. The industry addresses these applications differently because size limits vary resulting in different switches having different motor operator speed and torque requirements. It happens that a motor operator system as described that includes features, including size, speed and torque, making it quite suitable for underground switches is also frequently equally suitable for pad-mounted switches. A pad-mounted installation allows an additional degree of flexibility in the location of elements of the system. For example, a single pad-mounted enclosure may house the motor-gear train and pot (which can be assembled and enclosed substantially as in the case of the underground units but without the same need for sealing) and, also, the power and control elements, although two separate enclosures as described for the underground switch can be alternatively used. Even with the better worker access at a pad location the ability to set travel limits as indicated with a sensed position signal from the pot is advantageous. Hence, in its broader aspects features of the invention can be applied to motor operators generally, not limited to a specific location.

The motor-gearbox of the system is, in some forms, constructed in a way to achieve substantially permanent sealing making it particularly well suited for underground use. One embodiment that facilitates the assembly includes a continuous tube-like wall structure, which may be totally seamless (e.g., extruded aluminum) or have a welded seam (e.g., rolled stainless steel). The wall structure can be of materials with an overall cross-sectional configuration, e.g., substantially square, that contributes to mechanical stability in operation of the unit. The ends of the wall structure are closed by thicker end caps on which the running parts are supported. For example, the motor, gearing and pot can all be supported on one end cap, the one to be located away from the power switch, and the output drive shaft to the switch can be supported on the other end cap which is fastened to the switch enclosure. The first end cap also can have a part of the output shaft extending through for manual operation of the motor. Both shaft extensions can be sealed, such as by o-rings.

For such a construction, the assembly can be performed by a method that includes forming a subassembly of the motor, gearing, pot, and the output shaft, locating the output shaft in the first end cap, fastening the motor itself to the first end cap (the gearing and pot not requiring separate fastening), and placing the tubular wall structure over the subassembly with the edges of one end fit in a routing near the periphery of the inner surface of the first end cap. The wall structure has a cord grip and aperture for conductors (e.g., to the motor and the pot). When the wall is positioned around the elements to be wired but before assembling the second end cap, the necessary electrical connections are made. Then, the second end cap, which also has a routing mating with the end edges of the wall structure, is pressed onto the wall. Further, fasteners extending from one end cap to the other through a portion of each that is outside the wall structure unite everything into a stable assembly. The exterior surfaces where the end caps meet the wall structure can be further sealed by external application of a sealant.

These and other aspects of the present invention will be additionally illustrated and described in the accompanying drawings and the following text.

DETAILED DESCRIPTION OF THE INVENTION

Figure 1:
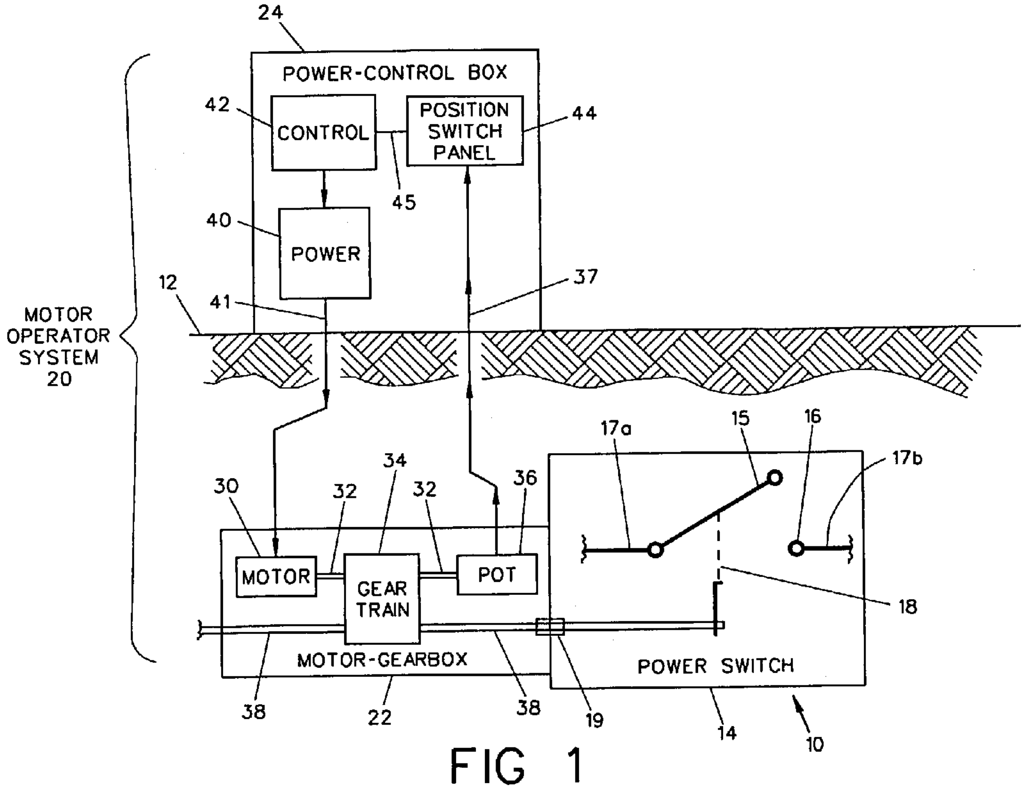
FIG. 1 is a schematic block diagram of a motor operator system, with an underground power switch, according to one form of the invention.

Referring to FIG. 1, a power switch 10 and a motor operator system 20 are shown for an underground installation. The switch 10 and a first part of the system 20, in first enclosure 22, are below ground level 12, typically in an underground concrete vault (not shown) with a manhole for access. The first enclosure 22 may sometimes be referred to herein as the motor-gearbox. A second part of the system 20, in a second enclosure 24, is located at or above ground level 12. The second enclosure 24 may sometimes be referred to herein as the power and control box.

The power switch 10 includes an enclosure 14 containing switch contacts 15 and 16 at least one of which, 15, is movable relative to the other, 16. Switch 10 is, for example, a vacuum or gas insulated switch of prior art construction. Segments 17*a* and 17*b* of one phase of a power line are connected to the respective contacts 15 and 16. (FIG. 1 is to be taken as schematic for other arrangements including usually a power switch 10 with a set of contacts for each phase of a three-phase distribution system, all operable by a single motor operator). A movable contact 15 is mechanically coupled at a coupler or decoupler 19 via an undetailed operating mechanism 18, to a shaft 38 from enclosure 22. The mechanism 18 and contacts 15 and 16 can be arranged in any way, including those presently practiced, for operation by the output force of the motor operator system 20 including, for example, torsional and reciprocating versions. The mechanism 18 typically includes an energy storing element (e.g., a spring) that is loaded to a trigger point by the motor operator before actual switch contact movement occurs. A switch operation on release of the spring makes enough sound to be easily heard above ground.

In enclosure 22, there is shown a motor 30 with an output shaft 32. A gear unit or gear train 34 and a rotary potentiometer 36 (sometimes referred to herein simply as the pot) are coupled with, and run off of, the shaft 32. Through shaft 32 and gear unit 34, the motor 30 drives the motor-gearbox output shaft 38 that goes to switch mechanism 18.

To help keep the terminology used in this description clear, the following is intended unless the context shows a different intent: The expression "motor-gearbox" refers to the whole of enclosure or box 22. The "motor" in the enclosure 22, likely to be a procured item for use by the maker of the system 20, may (or may not) happen to have a gear or gears within the same enclosure 30 with an actual electric motor. In the case of an example motor 30 in the more specific embodiment of FIG. 3, such gears are present. The "motor 30" means the motor unit 30 including the motor with whatever gears are also present in the unit. The "motor shaft" 32 is the output shaft from the motor unit 30, whether it is directly from a motor or is located to rotate as a result of gears in the unit 30. The expression "gear train" or "gear unit" 34, or the like, will refer to any one or more gears within the motor-gearbox 22 that are between the output shaft 32 at the motor 30 and the output shaft 38 of the box 22. The expression "motor drive" may be used to encompass a combination of a motor, with gears (if any) either in a motor unit 30 or a gear train 34, and with an output mechanism such as the rotary shaft 38.

A more specific example of the motor-gearbox elements will be described later. For the present, it is seen that the system 20 has the elements of enclosure 22 next to or near the switch 10 location, underground in this example. The motor 30 and gear unit 34 are whatever meets the speed, torque and other mechanical requirements of the switch 10. Both the switch enclosure 14 and the operator enclosure 22 are preferably hermetically sealed to allow operation even under flooded conditions. Because no adjustments in box 22 are contemplated after initial installation, it is unnecessary to have any access ports for a worker to set or reset anything.

The pot 36 is shown on motor shaft 32 in this example because that is a more direct and convenient location than is normally available on shaft 38. It is also likely to produce more accurate readings. It is arranged with the shaft 32 to develop a voltage varying according to the motor shaft position, which allows the position of shaft 38 and the closed or open position of the switch 10 to be determined, as will be described. A signal line 37 schematically represents an electrical connection from pot 36 to enclosure 24 carrying a switch position signal.

The second enclosure 24 of system 20 at the surface includes, in a first portion 40, the power supply for the motor 30, which depends on the motor requirements, e.g., AC line power, DC power developed from AC, DC battery power, or some combination. Single line 41 schematically represents an electrical power connection from the supply 40 to the motor 30. Enclosure 24 normally does not need sealing as is desired for box 22 in an underground location. (If the enclosure 24 is also underground, then sealing is of course desirable.)

The second enclosure 24 also includes a control portion 42 that can have electronic circuitry such as that similar to the existing automated motor operators described in the above mentioned Bulletin, for control of power to the motor 30, through power unit 40. As in the units of the Bulletin and other such equipment, the control unit 42 may be arranged for both local and remote operation, the latter through a radio and a Remote Terminal Unit (RTU). The control unit 42 also is electrically connected with a position switch panel 44 in enclosure 24 by circuitry represented by a single line 45. Panel 44 may sometimes be referred to as a "travel control panel". (Contents of an enclosure such as 24 may be referred to herein collectively as a "control and power supply assembly".)

One of the novel aspects of the arrangement of FIG. 1 is that a position signal from the pot 36 at the underground location is communicated to the above ground enclosure 24, here shown supplied by connection 37 to the position switch panel 44. For convenience in implementation, this example has the position signal on line 37 go to switch panel 44 which has its own electronic signal processor or microcontroller (e.g., if preferred to keep control block 42 the same as in prior designs). As an option, the circuitry for signal processing functions in parts 42 and 44 could be combined in a single package.

More description of examples of the workings of control 42 and position switch panel 44 will be found below. FIG. 1 generally shows an arrangement of elements for a position signal from the pot 36 to be processed according to a worker's interaction at switch panel 44 to operate the motor 30, including the setting and adjusting of motor travel limits, without any need to access the underground enclosure 22.

In the drawing figures, examples of elements of similar character will normally have reference numerals with the same last two digits.

Figure 2:
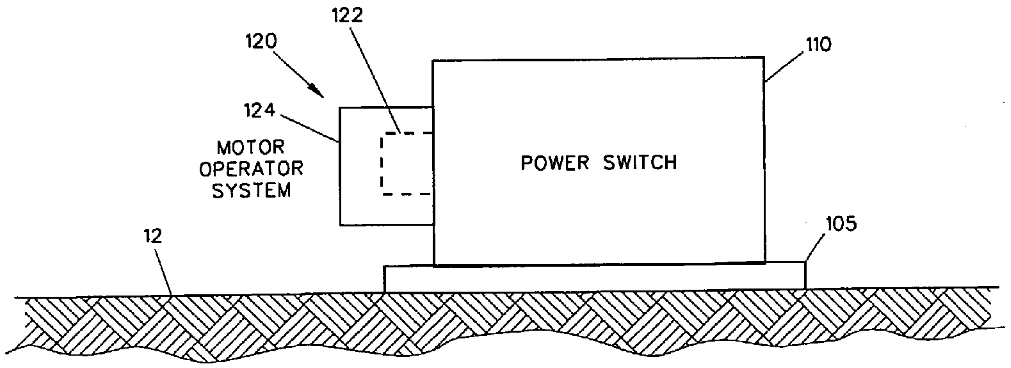
FIG. 2 is a schematic block diagram of another form of the innovative motor operator system with a pad-mounted power switch.

FIG. 2 shows a pad mounted installation with a pad 105 on the ground 12 supporting a switch 110 and a motor operator system 120. Switch 110 can be of a type like switch 10 but the above ground location often allows use of an enclosed air break switch, one not hermetically sealed. The internal elements of switch 110 are generally as described for switch 10 in FIG. 1.

Motor operator system 120 could comprise two separate enclosures, like 22 and 24 in FIG. 1, but preferably has one enclosure 124 containing all the functional elements of the system 120, i.e., such elements as are exemplified by those in both boxes 22 and 24 discussed above. For one embodiment, as shown, the enclosure 124 houses the elements of box 24, and also, in a subenclosure 122 inside of box 124, those of box 22.

The apparatus depicted in FIG. 2 is to make clear the system elements for an underground installation can be readily applied to the pad-mounted installation, particularly because power switches 10 and 110 likely to be used in the two cases often have similar speed and torque requirements for the motor operators 20 and 120. It should still be appreciated that features of the invention, such as use of a rotary pot for generating a position signal that is used for setting or adjusting travel limits without accessing the enclosure 22 or 122, are broadly applicable to a motor operator for a switch in any location.

Figure 3:
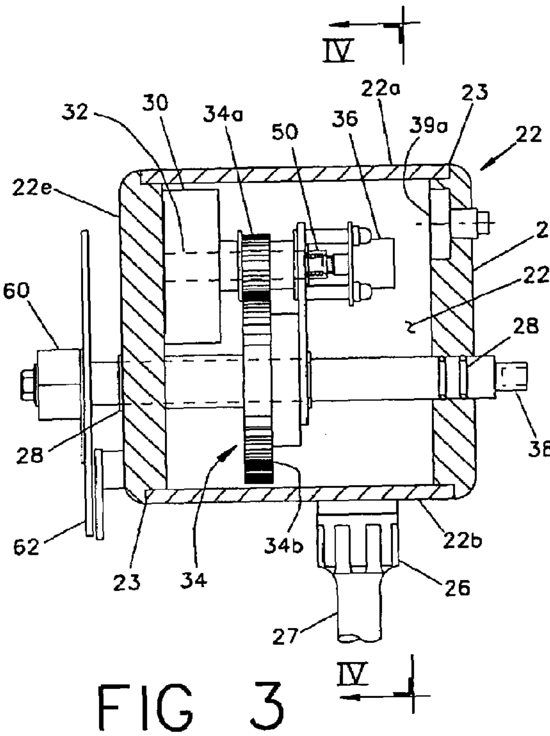
FIG. 3 is a side elevation view, partly in section and partly broken away, of one form of a motor-gearbox of the invention.
Figure 4:
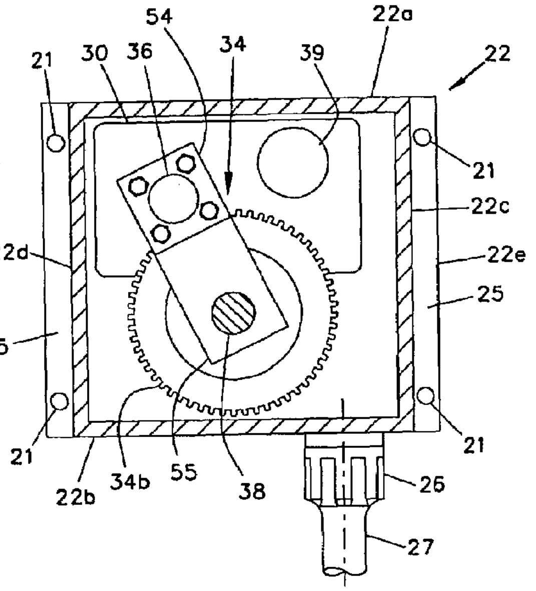
FIG. 4 is an end elevation view, partly in section, of the motor-gearbox of FIG. 3.

A more specific example of a motor-gearbox, such as box 22 of FIG. 1 or box 122 of FIG. 2, is shown in FIGS. 3 and 4 FIG. 3 looks inside enclosure 22 as if a section is taken just past a sidewall on the side facing the viewer (i.e., element **22*d* of FIG. 4). FIG. 4 is a right end view taken just inside of the right cap (i.e., element 22*f* in FIG. 3**). The relation of the sectioned and unsectioned elements will be apparent from the following description.

FIGS. 3 and 4 show a motor 30 which may be one that is commercially procured as a unitary motor and gear set. The motor 30, with whatever gearing accompanies it in the same unit from the motor manufacturer, may, but need not be one that by itself meets the mechanical requirements of a power switch it operates. For example, a motor 30 can be selected that can be coupled with a gear train 34 to achieve additional torsional output sufficient for power switches with which the motor-operator is to be used. The gear reduction of gearing 34 converts a higher speed, lower torque output of motor 30 on shaft 32 to a relatively lower speed, higher torque output on shaft 38. In this particular example, the gearing 34 includes a spur gear **34*a* running off the motor shaft 32 and a mating spur gear 34*b* on the output shaft 38. Each gear 34*a* and 34*b* has a tooth portion and a hub to the right of the tooth portion in FIG. 3**.

FIG. 3 shows a rotary potentiometer 36 on the shaft 32 from motor unit 30 to develop the above-described motor position signal. The pot, in this embodiment, was selected to be a commercially available ten turn, 1 K.ohm potentiometer coupled to the shaft 32 by a slip clutch 50 to prevent damage that otherwise might occur if the pot reached its travel limits. The slip clutch 50 is further discussed in connection with FIG. 5.

FIG. 3 shows some additional features of the example enclosure 22 and its contents. The enclosure 22 has, in this view, walls including a top wall **22*a*, a bottom wall 22*b*, and a far side wall 22*c*. A near side wall 22*d* (shown in FIG. 4**)

is also part of the enclosure. These four walls are joined by a front cap 22*e* and a rear cap 22*f* through each of which an end of the shaft 38 extends.

For underground units all the walls and the end caps of enclosure 22 are, for example, anodized aluminum or stainless steel with sealing provided by, e.g., silicone rubber adhesive. For pad units plain aluminum may be used, without sealing, as well as other materials.

A liquid-tight cord grip 26 and a conduit 27 are provided for electrical conductors, which include conductors represented by lines 37 and 41 in FIG. 1 (not shown in FIG. 3) as well as possible others. For example, the pot 36 has a pair of conductors for applying a voltage across its resistance and a third conductor to a wiper, all in accordance with usual potentiometer practice. Also present but not shown for simplicity are fasteners for attaching the housing 22 to a switch housing.

The shaft 38 has o-ring seals 28 through end caps 22*e* and 22*f*. Only the seals 28 in the end cap 22*f* are shown in FIG. 3, as if the end cap was cut away to expose them. At the left, or front, end of shaft 38 is a hexagonal coupler 60 to allow a hand tool (or manual handle) to be attached for manual operation and a pointer 62 serves to indicate whether shaft 38 has a power switch 10 or 110 in a closed or open position. (Also, see FIG. 9.) The hand tool coupler 60, with whatever hand tool or handle is used with it, is merely an example of means for manually operating the motor-gearbox.

The overall size of an enclosure 22 such as shown in FIG. 3 for underground or pad mounted switches is compact, for example, about 6 in. on each side of a cube.

When applied in a pad-mounted unit 124 such as in FIG. 2, an enclosure 22 as shown in FIG. 3 can be mounted onto a wall of the larger enclosure 124 that also houses power and control elements, as box 122 is shown in FIG. 2.

FIG. 4 is a right end view, taken just inside the end cap 22*f*, of the example enclosure 22 of FIG. 3. It can be readily seen that the walls 22*a*, 22*b*, 22*c*, and 22*d* are elements of a unitary tube-like member with a cross-section substantially in the form of a square. The metal of the walls may be, e.g., only about ¼ in. thick and is relatively easy and economical to form by extrusion of aluminum or by forming and welding stainless steel. One of the walls, here wall 22*b*, has the cord grip 26 fastened to it but none of the walls 22*a*, 22*b*, 22*c*, or 22*d*, need to have any of the running elements 30 through 38 mounted on it.

The end caps 22*e* and 22*f* are preferably thicker, e.g., about ¾ in., for good support of the motor unit 30 on cap 22*e* and running support of the shaft 38 through seals 28 on each of the caps 22*e* and 22*f*. Each end cap 22*e* and 22*f* has a routing 23 (FIG. 3), i.e., a groove or notch, cut into its interior face periphery that mates with the ends of the wall tube.

In the example shown, a subassembly is made of the end cap 22*e*, motor 30, gearing 34, pot 36, and shaft 38. That subassembly has the wall tube of the unified walls 22*a*, 22*b*, 22*c*, and 22*d* joined by its left end being snugly fit into the routing 23 of the end cap 22*e* with the cord grip 26 and conduit 27 on the wall 22*b*, and the wiring to the motor 30 and the pot 36 completed, prior to putting the right end cap 22*f* in place by fitting its routing 23 with the right end of the tube wall.

Both end caps, of which the end cap 22*e* is seen in FIG. 4, are wider in portions 25 than the tube wall structure (outside of routing 23 in relation to walls 22*c* and 22*d*) with space for fasteners 21 (such as machine screws) extending through apertures in end cap 22*f* past the walls 22*c* and 22*d* (two on each side) and into the other end cap 22*e* for the purpose of securing the end caps with the wall structure, thus providing torsional support.

The structure 22 of FIGS. 3 and 4 is especially suitable for underground, possibly flooded, locations. Because the tube wall with walls 22*a, b, c*, and *d* is unitary and seamless, no sealing is needed between wall segments. The fit between the walls and the routing 23 of the end caps can be made tight; merely coating with a sealant, such as silicone rubber adhesive, will provide more assurance against leakage. The shaft o-rings bearings 28 also satisfy the sealing needed for underground use.

Essentially the same form and assembly steps can be used for pad-mounted units, usually without any needed joint sealing. Thus the commonality of parts simplifies and economizes the manufacture of the motor-gearboxes for either sealed or unsealed types of installations.

FIG. 4 also shows how the example motor unit 30 has its own housing of a substantially rectangular configuration. That is because it includes, in the example unit as procured, both a small DC permanent magnet motor and some gearing. The electric motor itself is not shown in FIG. 4 but is within the right hand portion of the unit 30. The shaft 32 (FIG. 3) comes out of the unit 30 in the left portion and comes directly through the first gear 34*a* of the gear train 34 to the pot 36.

In addition, FIG. 4 shows an outline of a desiccant bottle 39 that is mounted in an opening or recess 39*a* (shown in FIG. 3) in the endwall 22*f*. (For greater clarity, bottle 39 is omitted from FIG. 3). The bottle 39 is, for example, of a plastic with about 1 in. diameter and 3 7/16 in. length with a number of holes exposing its contents to air in the enclosure 22. The bottle 39 has in it a cloth bag with, for example, about 1 oz. of silica gel and about 1 oz. of activated carbon. The silica gel is especially effective for capturing any water vapor that might be in the enclosure 22. The activated carbon is more effective than the silica gel for capturing organic vapor such as might make its way into the enclosure from a sealant on the outside of joints between the wall structure and the end caps.

Such a desiccant bottle 39 helps insure long life for the motor 30, pot 36, and other working elements in the enclosure, especially for underground units. For pad-mounted equipment, where the enclosure is not sealed, a nearby heater (discussed in connection with FIG. 10) is considered effective without the desiccant.

The location 39*a* of the desiccant bottle 39 in the end cap 22*f* also is where a small opening through the end cap occurs. For hermetically sealed units, once the wall structure and end caps are assembled, and after the exterior of joints is sealed, the enclosure 22 is pressure tested (e.g., 12 psi for 5 min.) through that opening to ensure there are no leaks. After a satisfactory test, ambient air is allowed in and the bottle is then filled with the desiccant. Then a plug is sealed into the smaller opening that leads into the desiccant bottle 39 in location 39*a*.

The substantially square configuration for the unitary continuous wall structure of walls 22*a*, 22*b*, 22*c*, and 22*d* is favorable for mechanical stability in operation of the motor-gearbox. Other polygonal shapes, e.g., hexagonal, are also suitable. While the enclosure may have rounded corners, possibly even being circular in cross-section, shapes such as that illustrated are relatively easy to obtain of standard structural tubing with extruded aluminum and give good results with good economy. Stainless steel formed and welded is also adequate although more expensive. Whatever the shape of the walls is, that dictates the shape of the mating routing on the end caps.

Figure 5:
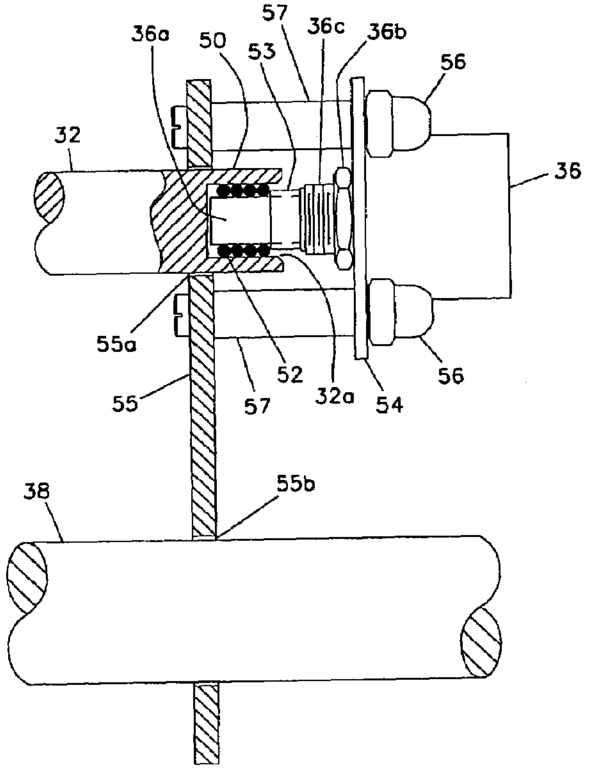
FIG. 5 is an enlarged view, partly in section, of part of the apparatus of FIG. 3.

FIG. 5 shows an enlarged view of an example pot 36 and slip clutch 50 that are assembled for use in a combination such as that of FIGS. 3 and 4. The rotary pot 36 requires a minimum force for accurate turning but has a certain stopper strength that may be exceeded by the torsion from the motor shaft 32. In that case the pot 36 would likely be destroyed at its end limits of travel if it had a solid connection with the motor shaft 32. The slip clutch 50 protects against such destruction. In the example of FIG. 5, a slip clutch 50 of simple parts and low expense is applied that serves the purpose well, although other forms of a slip clutch can also be used. A shaft 36*a* of pot 36 fits within a recess 32*a* of motor shaft 32 with o-rings 52 on the end of the pot shaft 36*a* and facing the wall of recess 32*a*, with no direct contact, axially or laterally, between the pot shaft 36*a* and the motor shaft 32. A spacer 53 helps keep o-rings 52 retained in alignment. For the particular case, the o-rings 52 are selected so the pot 36 turns steadily and safely for a predetermined number of turns, before slipping.

The pot 36 is mounted on a floating guide plate 54 by a nut 36*b* on a threaded part 36*c* surrounding the shaft 36*a*. The pot shaft 36*a* passes through a hole (not shown) in plate 54 that allows free rotation. The guide plate 54 is joined with another plate 55, sometimes called an anti-separation plate, that has apertures 55*a* and 55*b* for respective shafts 32 and 38. The plate 55 is not secured to any wall of the enclosure. Its apertures 55*a* and 55*b* allow free running of the shafts 32 and 38 without requiring lubrication or bearings but the plate 55 contributes to maintaining accurate alignment of the parts which otherwise could become distorted due to torsional effects. The floating guide plate 54, sometimes called a pot plate, is fastened to the other plate 55 by fasteners 56 and 57, such as bolted standoff 57 from plate 55 with nuts 56, securing the pot plate. The nuts 56 allow an air space so guide plate 54 is not solidly joined with the other plate 55. In this way, the shaft 32 is prevented from applying cantilevered forces that could cause undue wear or cause a change in the force to the pot resulting from the slip clutch 50.

One advantage of an assembly as shown in FIG. 5 is that the slip clutch 50 can be easily varied in its force limits by varying the number and size of the o-rings 52. That is, a design engineer may choose the motor 30 and pot 36 relatively independently and then devise a slip clutch 50 suitable for the choices made. In the illustrated example, four neoprene o-rings 52 are used in the slip clutch 50. The slip clutch 50 accurately transfers up to ten motor shaft rotations to the rotary pot and only slips at the end of ten rotations. The characteristics can be varied by altering, for example, the number, size or material of the o-rings and the space they occupy between the pot shaft 36*a* and the shaft bore 32*a*.

Figure 6:
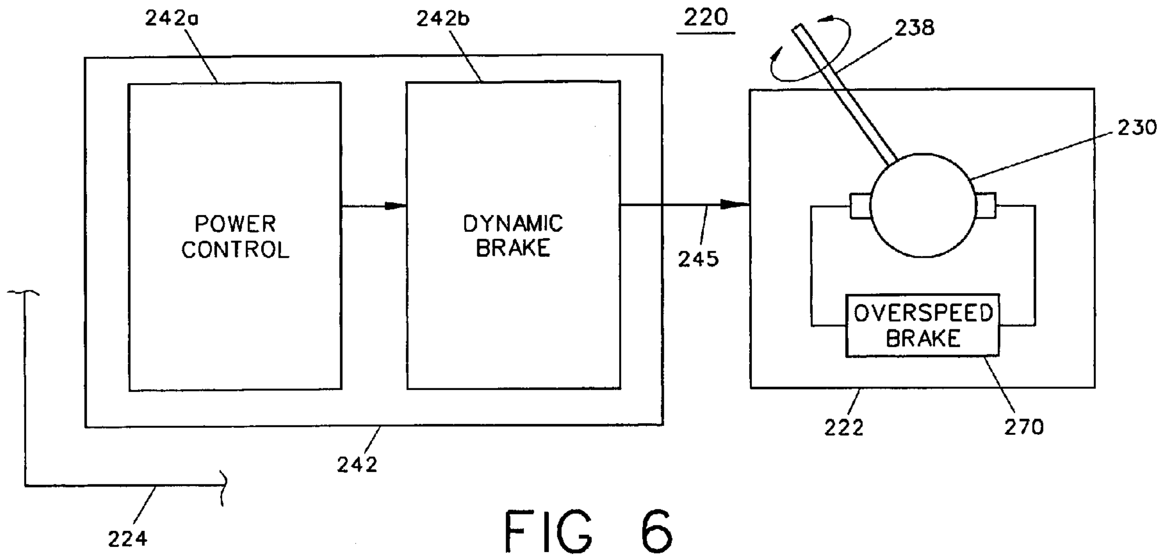
FIG. 6 is a block circuit diagram of certain aspects of the invention relating to braking.
Figure 7:
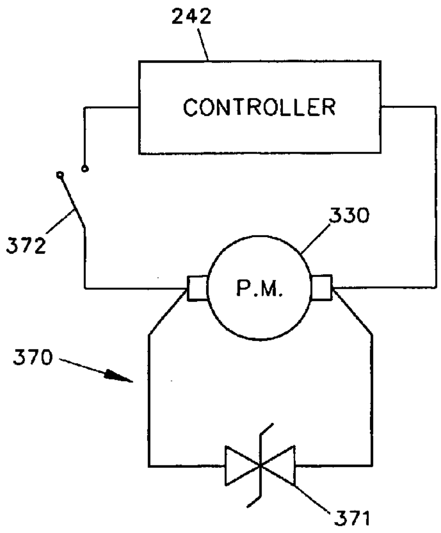
FIG. 7 is a circuit diagram of part of the apparatus of FIG. 6.

FIGS. 6 and 7 illustrate another aspect of the present invention. FIG. 6 shows a schematic view of a motor operator system 220 with a motor-gearbox enclosure 222 and a power and control enclosure 224. Each of the enclosures 222 and 224 can include elements as discussed above with respect to the enclosures 22 and 24 of FIG. 1 (or the combined unit 124 of FIG. 2), such as a pot in box 222 and a position switch panel in box 224, which are not shown here. FIG. 6 is to illustrate, in boxes 224 and 222, the presence of some additional elements not previously shown. For this discussion, a control circuit block 242 in box 224 can be understood to include the elements of control 42 in FIG. 1 which typically include some power control circuitry 242*a* and a dynamic braking circuit 242*b*. Dynamic braking has been previously provided in motor operators for power switches basically to achieve an accurate stopping point for a motor 230 at the intended location for the power switch contacts. The dynamic brake typically uses a reverse electromagnetic force (emf) generated by the motor's motion to generate a current which is passed through either a resistor or the motor windings and dissipates the mechanical energy as heat. Hence, the motor operator system 220 is shown as applying that kind of prior art technique. Such a dynamic brake does not, however, limit the speed at which the motor may move in reaching its stopping point.

Circumstances may exist in which the motor 230 is subject to possible damage by an overspeed condition that is not affected by the dynamic brake 242*b*. For example, the motor 230 may be coupled to a manual operator of a power switch, such as via output shaft 238 from motor-gearbox 222. If motor 230 is turned without any restraint during manual operation, speeds destructive to the motor (e.g., by centrifugal force on the motor windings) can be reached absent a very rugged motor structure.

The motor 230 may be chosen as previously described for motor 30 and not be rugged enough to avoid overspeed dangers. To protect the motor 230 an overspeed brake 270 is connected across the armature of the motor 230. The overspeed brake 270 is a circuit that allows unrestrained motion of the shaft 238 only up to a threshold speed and then automatically applies braking action. The brake 270 is bi-directional, that is, it functions in both directions of shaft rotation. Referring to FIG. 3, an overspeed brake is not shown but when used in the assembly would be connected across the power leads to the motor unit 30.

The overspeed brake 270 comprises, for example, a bidirectional over-voltage suppressor such as a bi-directional threshold breakdown device, metal oxide varistor, or a MOSFET type of device. The brake 270 is to clamp the voltage across the motor armature at a threshold below a voltage resulting from an overspeed that could harm the motor, but above the normal operating voltage. With an overspeed brake 270 the system designer has more freedom in the choice of the motor 230 or 30.

A more specific example for the overspeed brake 270 is shown in FIG. 7. In FIG. 7, a motor 330 is a permanent magnet DC motor and the overspeed brake 270 has a bi-directional voltage suppressor diode 371 (such as one commercially available as a "Transorb" diode) connected across the motor armature. Box 242 containing power control and dynamic braking per FIG. 6 is also connected to motor 230 through a switch 372. Another example of a motor that can be used in the same type of arrangement is a DC shunt wound motor.

Figure 8:
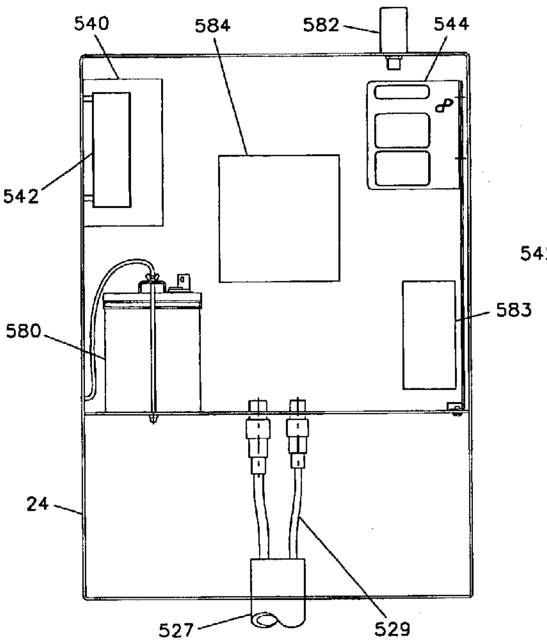
FIGS. 8 and 9 are front elevation views of different forms of control units for use in the invention.
Figure 9:
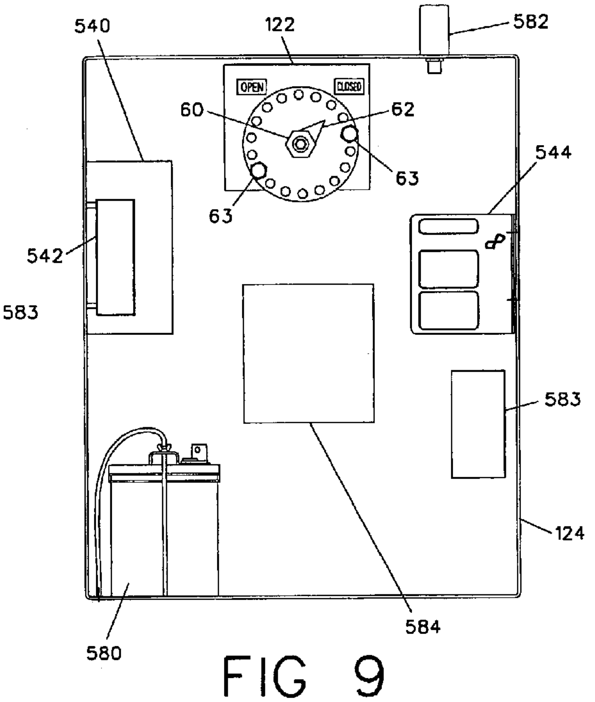

FIGS. 8 and 9 illustrate, respectively, representative examples for power and control box 24 of FIG. 1 and the complete system box 124 of FIG. 2. They show how there can be much in common in motor operator systems for both underground and pad mounted installations. Each has a power module 540, in addition to a backup battery 580, a control module 542, and a position switch panel 544. In these examples, the switch panel 544 has its own microcontroller (not shown) for processing position signals from the rotary pot in the motor-gearbox of the system. That allows control module 542 to be designed for use in various operator systems with or without panel 544. Both the units 24 and 124 are shown with a radio antenna 582 for a radio 583 and an RTU 584, optional features that can be provided for remote operation. Except for the position switch panel

544 in each enclosure 24 and 124, and a motor gear box 122 as shown in FIG. 9, design for the mentioned elements can be substantially like prior technology, such as the automated motor operators described in the above mentioned Bulletin. Wiring for the elements in the units 24 and 124 in FIGS. 8 and 9 is not fully shown. Each such unit will typically have additional elements not shown here, such as a thermostat controlled heater and fuses, as in the equipment in the Bulletin. Merely as examples, units 24 and 124 can each be of a size about 21 in. wide by 29 in. by 15 in. deep. FIGS. 8 and 9 show units 24 and 124 without the usually present gasketed and lockable doors that provide weather resistance and security.

In FIG. 8, there is a conduit 527 through the bottom wall of the enclosure 24 for conductors 529 to an exterior motor-gearbox 22, such as like that shown in FIGS. 1, 3 and 4, that could be at the underground location.

In FIG. 9, the otherwise similar enclosure 124 has a motor-gearbox 122 on the back wall of the enclosure 124 for mechanical coupling to a pad-mounted power switch (like 110 in FIG. 2). FIG. 9 gives an idea of the convenience afforded by a compact motor-gearbox 122 that can be applied with some versatility for different applications.

The end view of motor gear box 122 in FIG. 9 is the left end of the unit 22 in FIG. 3, showing a direct view of the hexagonal coupler 60 and pointer 62. Also shown is a locking disk with a pair of stop bolts 63 that set the farthest limits of the movement of the output shaft, under either motor operation or manual operation. That can be important during a manual operation or if the motor operator malfunctions.

Figure 10:
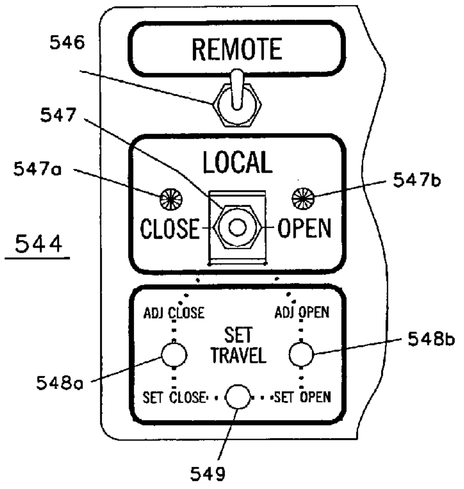
FIG. 10 is an enlarged front elevational view of part of the apparatus of FIGS. 8 and 9 for setting travel limits.

FIG. 10 shows an enlarged view of a position switch panel 544 suitable for use in FIGS. 8 and 9. Preliminarily, it is to be recognized the setting of travel limits with the present invention can achieve results like prior art arrangements, such as with limit switches, but in a much more convenient way and without concern about limit switch wear. In general, a worker performing hand operations at a switch panel 544 and seeing, hearing or otherwise being informed (such as by a co-worker) of a switch tripping to an open position or a closed position, is highly effective, simple and convenient. The particular example only requires a sensor to give a position signal (without, for example, other sensors for motor current, speed, or other parameters, at least some of which are susceptible to variation due to temperature changes) and only requires a controller that needs to process that single sensed signal to effect a desired travel setting or adjustment. So the result in the particular example system is one that utilizes microprocessor technology in a simple, sure and dependable way with human judgment as a final determinant of achieving a desired result. Also, the particular technique is one that is equally effective whether or not the switch operating mechanism includes an energy storage spring, or the like. Even if the motor shaft 32 or output shaft 38 is not producing any movement of a switch contact during part of its travel, while a spring is being wound, the worker just needs to determine (and the control to know in its memory) whether the result of the motor operation is successful. In the case of an enclosed switch, such as in an underground installation, it is helpful that the switch have a spring for a positive indication of when it trips to either the open or closed state.

In FIG. 10, the example position switch panel 544, for use in either unit 24 of FIG. 8 or unit 124 of FIG. 9, has a first switch 546 for switching between remote operation (shown here) and local operation. Panel 544 also has an OPEN-CLOSE toggle switch 547 which has an unlabeled center off position. Indicator lights 547*a* and 547*b* are respectively shown by the labels of close and open positions for switch 547. Typically, light 547*a* is red and light 547*b* is green. The switch 547 can be toggled to a desired position and then released.

In addition, a SET TRAVEL portion of the panel 544 has a first push button switch 548*a* (e.g., with a red top), a second pushbutton switch 548*b* (e.g., with a green top), and a third pushbutton switch 549 (e.g., with a black top). By the dashed lines from each of switches 548*a* and 548*b* to the OPEN-CLOSE switch 547 and to switch 549 (referred to as the SET button), along with the displayed legends "ADJ CLOSE", "ADJ OPEN", "SET CLOSE", and "SET OPEN", a worker can readily see which switches are used together for travel limit settings and adjustments. Although not so labeled on FIG. 10, switches 548*a*, 548*b*, and 549 may sometimes be referred to in the following description as the CLOSE, OPEN, and SET pushbuttons, respectively.

The switches 546, 547, 548*a*, 548*b*, and 549, and lights 547*a* and 547*b*, are all interconnected behind the front of panel 544 with a microcontroller (not shown) that is further interconnected with the control module 542 of the units of FIG. 8 or 9. The microcontroller of panel 544 includes a circuit portion to convert an analog pot signal to a digital signal and to use the digital signal in a programmed microprocessor to process the pot signal in accordance with settings and other data of a memory element (e.g., comparison of a current position with the last set position), all consistent with general microcontroller practice but here specifically programmed and arranged for operations and adjustments according to worker interaction with the switches on the panel 544. Microcontrollers with sufficient input and output connections for the panel 544 that include an analog to digital converter and an EEPROM type of memory are widely available and their programming and general methods of use are well known.

To perform functions at the panel 544, in accordance with this example, a worker first needs to set the REMOTE/LOCAL switch 546 to LOCAL. Then various options are available. Operating just the switch 547 to OPEN or CLOSE will cause the motor 30 (as well as the motor-gearbox output shaft 38) to move from its current position to the corresponding position indicated on the toggle switch, according to the position settings in the memory of the microcontroller.

When a switch 10 and a motor operator system 20 or 120 are first installed and set up for operation, a suitable set up procedure can include:

manually closing the switch 10;

attaching the motor-gearbox 22 or 122 to the switch 10;

applying battery power to the motor-gearbox, without any AC line power to the switch or its operator, resulting in a position signal to the controller indicating a closed position;

setting the closed position as a travel limit at the panel 544;

manually operating the motor-gearbox to move the switch to an open position; and setting the open position as a travel limit at the panel 544.

Without any further manual operations at the switch location, the travel limits can be tested and adjusted as desired at the panel 544. For example, the original set points upon completing an installation procedure as described above may be altered a little, to a more closed or more open position, if desired. That could prepare a spring loaded switch operating mechanism for more sure operation.

More specifically with respect to the particular panel 544, in order to set a current location of the motor as the OPEN or CLOSE position, the worker holds down the SET push-button 549 while also pressing the corresponding OPEN push button 548*b* or CLOSE push button 548*a* (briefly, e.g., 2–3 secs.). In either case, the corresponding light 547*a* or 547*b* will blink showing that the point has been set, i.e., recorded in the memory of the microcontroller of the panel 544 and the pushbuttons are released. Subsequent operation, either remote or local, will occur according to that position until there is a further adjustment.

If the worker wants to adjust a present OPEN or CLOSE set point, either the OPEN button 548*b* or the CLOSE button 548*a* is held down while moving the switch 547 to the OPEN or CLOSE direction as the case may be, without operating the SET pushbutton 549.

The panel 544, in this example, is programmed to effect a specific increment of motor motion (i.e., motor-gearbox output shaft) on each such operation. For example, the motor output shaft 38 of unit 22 will move 3 degrees toward a more open or more closed position. If the worker is then satisfied that the position reached is what is desired (e.g., by hearing or otherwise observing the switch 10 has opened or closed), and does not perform another operation, then the position reached will become the set position. Otherwise the worker continues with one or more other ADJ OPEN or ADJ CLOSE operations. If the worker finds the predetermined increment is too much, a reverse operation is performed to back up. If the system hits a mechanical stop in either direction and is unable to complete the increment of travel, the worker waits a few seconds while the microcontroller times out and the limit reverts to the last setting. In all these instances, the software running on the microcontroller produces the desired functions, in response to the worker's operation of the position switches, while taking advantage of the precise position signal produced by the potentiometer (e.g., pot 36) and recorded in the microcontroller.

The example systems as described contemplate that all the operations are simply performed by motor operations in either of the two directions with full torque and with only the benefit of the position signal on line 37, as far as electrical readings from the motor-gearbox 22 or 122 are concerned. This has been found to be satisfactory for numerous underground and pad mounted distribution switches 10 or 110. However, a system incorporating additional functions in the programming of the microcontroller of panel 544, with or without possible additional sensed signals, can be readily devised and could utilize others of the above-described features of the example system.

The description of the local operations at the switch panel 544 of an enclosure 24 or 124 is just an example of a highly useful way to perform needed motor travel adjustments outside the motor enclosure 22 or 122. Additionally, a position signal from a pot 36 or other position sensor can be made use of at substantially any location the signal can be communicated to (e.g., a central control station by radio) and which has the ability to discern switch position (e.g., by communication to it of visual or audible signals confirming power switch trips and closings).

Figure 11:
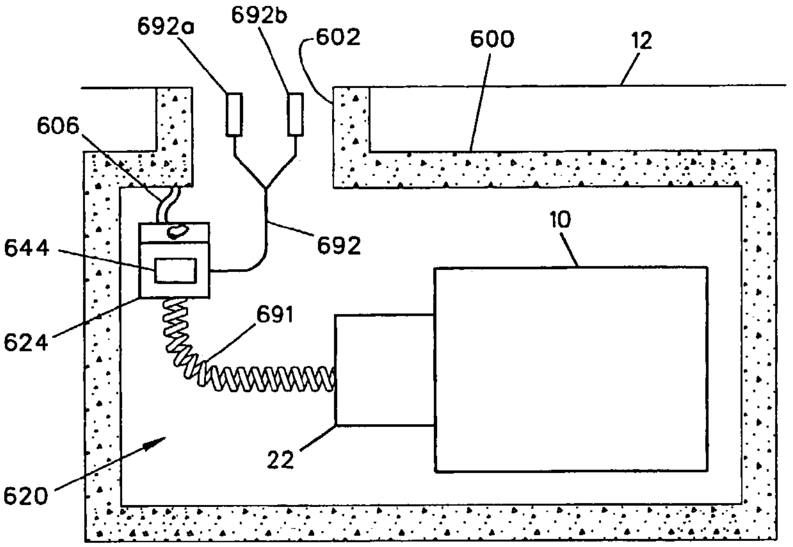
FIGS. 11 and 12 are schematic views of motor operator systems, with an underground power switch, according to other forms of the invention.

FIG. 11 shows another example of the invention in an underground vault 600 accessible through a manhole 602 (the cover of which is not shown). A switch 10 and motor-gearbox 22 are in the vault 600. The box 22 is part of a motor operator system 620. Instead of box 22 communicating with a surface mounted power and control box 24, as in FIG. 1, it communicates, via conductors in a cord 691 (which includes counterparts to conductors 37 and 41 of FIG. 1) to a hand-holdable, portable, controller 624. The portable controller 624 is shown in FIG. 11 as it is when not in use; it is here positioned, in a removable manner, on a hook 606 fixed to a wall of the vault 600, or manhole 602, at a location where a worker can readily reach in and take it out of the manhole for hand-held use.

In this example, the controller 624 is one that has the necessary elements of the box 24 but without a power supply (e.g., a battery) within the controller 624. Instead the controller 624 has a power cord 692 ending with two attachments (e.g., alligator clips) 692*a* and 692*b* for attaching the power cord 692 to a power source, typically a battery in a truck that the worker drove to the vault location, for temporary use to perform functions with the controller.

The controller 624 has a position switch panel 644 like or similar to the panel 544 for setting and adjusting travel limits of the motor in box 22. Normally, panel 644 is configured for just local operation. A worker opens the manhole 602, reaches in, takes controller 624 off the hook 606 and then pulls it out. The cord 691 is long enough to allow the controller 624 to be carried to a convenient location and the cord 692 is long enough so attachment of its clips 692*a* and 692*b* can be easily performed. (When not in use, cord 692 will normally just hang down from controller 624 in the vault 600.) With that arrangement, and the worker's interaction with the panel 644, the previously described functions can be performed.

The arrangement of FIG. 11 is clearly desirable in locations where all utility installations are required to be underground and a box 24 installed at the surface is not permitted. Prior portable control units for underground motor operators have lacked the ability to set and adjust motor travel limits.

Figure 12:
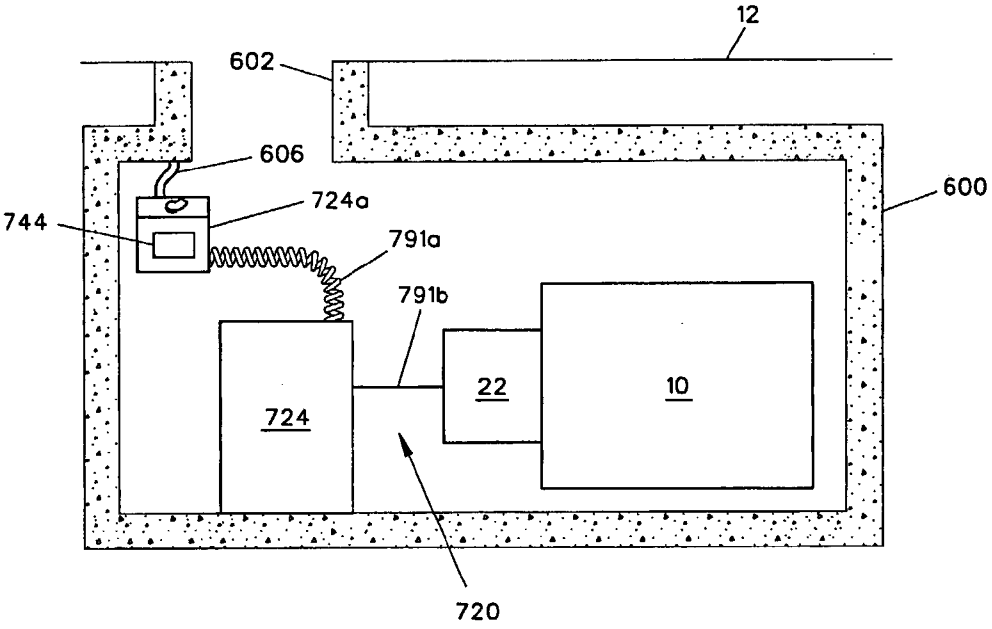

FIG. 12 shows a further example of an underground installation. A vault 600 contains a power switch 10 and a motor operator system 720 including a motor-gearbox 22. System 720 also includes a power and control box 724 located in the vault 600 and a hand-holdable, portable, unit 724*a* for travel settings and adjustments.

The power and control box 724 is preferably sealed like the motor-gearbox 22 and contains, for example, elements like the box 24 of FIG. 8 including a power module 540, a control module 542, and a battery 580, but a position switch panel 744 is on the portable unit 724*a* rather than in the box 724. Conductor 791*a* represents an extendable interconnection between the box 724 and the unit 724*a* and line 791*b* represents interconnections between boxes 724 and 22.

The portable unit 724*a* can normally rest on a hook 606 in the vault 600. A worker can reach in and withdraw it through the manhole 602 for use above ground level 12 substantially in the manner of the unit 624 of FIG. 11, but without needing to make connections to an about ground power source. However, if desired, the unit 724*a* can also have a cable 692 and clips 692*a* and 692*b*, like those with the unit 624 of FIG. 11, for use in case of inadequate power from the box 724.

A variation of the arrangement of FIG. 12 is one in which the elements of the power and control box 724 and those of the motor gearbox 22 are combined in a single enclosure, sealed for use underground. In one form of that variation the motor gearbox elements can have their own subenclosure as previously described (with or without sealing). In either case, whether with two enclosures 724 and 22 as shown in FIG. 12 or with a combined enclosure, the functions of a controller, such as 724*a*, can be on a hand-holdable unit as shown or some fixed unit, e.g., an above ground installed panel.

The position switch panel 544 (or panel 44 of FIG. 1 or panels 644 and 744 of FIGS. 11 and 12), and the described methods of use of such a panel, are merely examples of a means (or a method) for setting and adjusting, at a location outside of the housing 22 or 122, travel limits of the motor drive using position signals from a position sensor, e.g., the rotary pot 36. By way of further example, the microcontroller of described panel 544 could be replaced by circuitry including discrete logic elements, counters, comparators, etc. The position switch panel switches 546, 547, 548*a*, 548*b*, and 549 can all be varied in type and location, and their legends, as could the lights 547*a* and 547*b*. For example, a worker could interact with the circuitry that receives the signal from the position sensor by some alphanumeric keyboard or by touching, directly or by a cursor on a computer video monitor, elements of a display. Furthermore, any or all such elements of a panel 544 or its alternatives can be more intimately combined, than shown in the illustrated embodiments, with elements that perform the functions of the power module 540 or 40 and the control module 542 or 42.

Additional elements of a motor operator system with one or more features of the invention would normally include one or more brackets for physical support of the motor-gearbox with the switch so the unit stays in position despite the forces on it during switch operations. Also, a mechanical coupler-decoupler, indicated generally as element 19 in FIG. 1, is further provided for decoupling the motor-gear box output shaft from the power switch, such as for occasions for routine tests of the motor without disturbing the switch position. Such features can be provided in suitable forms in accordance with past practice and are not detailed further in this description.

In its broader aspects, use of a potentiometer for position signals may take other forms from that of a rotary pot and slip clutch on a motor shaft as shown here. The arrangement shown has simplicity and effectiveness. Other potentiometers are also suitable for achieving a motor position signal that is reliably renewed after a power outage. Shaft position encoders that are hall effect devices or optical sensors are not able to do so. That is also the case with other 2-phase encoders, sometimes referred to as relative position sensors, in contrast to absolute position sensors which in addition to a pot, include absolute encoders (mechanical or optical) and a "Selsyn" resolver, for example.

It is advantageous to have a position sensor that is of the type characterized by an ability to resume generating an accurate position signal upon restoration of power following a loss of power to the motor drive. A loss of power to the motor drive, in this context, means a total loss of power; both the AC line power and any backup (e.g., battery) power are out. The ability to resume generating an accurate position signal means the position signal from the position sensor indicates the actual position of the drive, regardless of any drive movement during the time the power is off. Absent that ability, a motor operator system faces a problem because, even with a nonvolatile memory in the controller storing predetermined travel limits, the motor operator may have moved during the power outage, such as by an actual, or a merely attempted, manual operation. Such movement makes the output from a relative position encoder, after power is restored, not accurate and not useful for the controller, so a repeat of a procedure like that used when the motor operator is first installed with the switch may be necessary. In the case of position sensors that have the described ability, e.g., potentiometers and absolute encoders, a signal is generated immediately upon power being restored that is accurate, even if such movement has occurred.

The embodiments disclosed are merely some examples of the various ways in which the invention can be practiced.

What is claimed is:

1. A power switch motor operator system comprising:

a first enclosure housing a motor with a motor shaft, a gear train running on the motor shaft, and an output shaft from the gear train having an end extending from the first enclosure arranged for mechanical coupling to a movable contact of a power switch;

a power supply and control assembly in a second enclosure electrically connected to the motor in the first enclosure for operation of the motor;

the first enclosure also including a rotary potentiometer arranged to develop a voltage indicating the rotary position of the motor shaft and to communicate a signal representing that voltage to the second enclosure;

the second enclosure also containing a position switch panel that electrically communicates with the power supply and control assembly and includes switches for setting and adjusting travel limits for the motor shaft using the signal from the potentiometer without requiring access within the first enclosure.

2. The system of claim 1 further comprising:

a slip clutch between the motor shaft and the potentiometer.

3. The system of claim 2 where:

the slip clutch comprises a number of o-rings that allow motor shaft motion to be transferred to the rotary potentiometer while limiting torsion on the potentiometer.

4. The system of claim 1 where:

the first enclosure is sealed for use in underground and flooded locations and is located apart from the second enclosure.

5. The system of claim 1 where:

the first enclosure is located within the second enclosure with the output shaft also extending from the second enclosure.

6. The system of claim 1 where:

the output shaft from the gear train also allows manual operation of a power switch with the motor deenergized.

7. The system of claim 6 where:

an overspeed brake circuit is connected with the motor and comprises a bi-directional overvoltage suppressor connected across an armature of the motor, the suppressor being such that it becomes conductive at a voltage generated in the armature, due to the manual operation, in order to brake the motor prior to the motor reaching an overspeed condition.

8. The system of claim 7 where:

the motor is a permanent magnet motor.

9. The system of claim 1 where:

the position switch panel includes switches for selectively directing motor and power switch movement in a power switch CLOSE direction, directing movement in a power switch OPEN direction, setting a power switch CLOSE position in a memory element and setting a power switch OPEN position in the memory element.

10. The system of claim 9 where:

the position switch panel also includes a first adjusting switch for use together with an OPEN switch to advance the motor an increment of motion in the OPEN direction, on each operation of the first adjusting switch and the OPEN switch, and a second adjusting switch for use together with a CLOSE switch to advance the motor an increment of motion in the CLOSE direction, on each operation of the second adjusting switch and the CLOSE switch.

11. The system of claim 4 where:

the first enclosure is installed in an underground location near a power switch the system operates;

the second enclosure is installed at an above ground location and electrical conductors are connected between the first and second enclosures.

12. The system of claim 11 where:

the output shaft from the gear train of the first enclosure allows manual operation of a power switch with the motor deenergized;

an overspeed brake circuit is connected with the motor and comprises a bi-directional overvoltage suppressor connected across an armature of the motor, the suppressor being such that it becomes conductive at a threshold voltage generated in the armature, due to a manual operation, in order to brake the motor prior to the motor reaching an overspeed condition;

the motor is a reversible DC motor; and the threshold voltage of the suppressor is greater than the operating voltage of the motor when the motor is energized.

13. The system of claim 12 where:

the motor is a permanent magnet motor.

14. The system of claim 12 where:

the motor is a motor with a shunt field winding.

15. The system of claim 11 where:

the first enclosure comprises a wall structure of continuous metal walls of a first thickness, with open ends, and first and second metal end caps of a second, greater thickness in a close fitting, sealed, relation to the open ends of the wall structure, and the motor, gear train and rotary potentiometer are all directly supported on only one end cap and the output shaft is supported by both end caps.

16. The system of claim 11 where: the rotary potentiometer is mechanically coupled to an end of the motor shaft through a slip clutch.

17. The system of claim 16 where:

the motor is a permanent magnet motor with an overspeed brake circuit within the first enclosure is connected to the motor.

18. The system of claim 1 where:

the first enclosure is inside of the second enclosure with the output shaft also extending from the second enclosure; and the second enclosure is installed at an above ground location near a power switch the system operates.

19. The system of claim 18 where:

the output shaft from the first enclosure allows manual operation of a power switch with the motor deenergized; and an overspeed brake circuit is connected with the motor and comprises a bi-directional overvoltage suppressor connected across an armature of the motor, the suppressor being such that it becomes conductive at a threshold voltage generated in the armature, due to a manual operation, in order to brake the motor prior to the motor reaching an overspeed condition.

20. The system of claim 18 where:

the first enclosure comprises a wall structure of continuous seamless metal walls of a first thickness, with open ends, and first and second metal end caps of a second, greater thickness in a close fitting, sealed, relation to the open ends of the wall structure, and the motor, gear train and rotary potentiometer are all directly supported on only one end cap and the output shaft is supported by both end caps.

21. The system of claim 18 where:

the rotary potentiometer is mechanically coupled to an end of the motor shaft through a slip clutch.

22. The system of claim 20 where:

the motor is a permanent magnet motor with an overspeed brake circuit within the first enclosure connected to the motor.

23. Apparatus comprising a motor operator system in accordance with claim 1 in combination with a power switch where:

the output shaft is mechanically coupled to a movable contact of the power switch.

24. The apparatus of claim 23 where:

the power switch is a switch selected from the group consisting essentially of vacuum switches, gas-insulated switches, and enclosed air-break switches.

25. The apparatus of claim 24 where:

the combination of the power switch and the first enclosure is located in an underground vault and the power switch is either a vacuum switch or a gas-insulated switch.

26. The apparatus of claim 24 where:

the combination of the power switch and the first enclosure is located on ground level and the power switch is an enclosed air break switch.

27. The apparatus of claim 26 where:

the first enclosure is located inside of the second enclosure.

28. A power switch and a motor operator in a combination comprising:

contacts in the power switch including at least one movable contact;

a motor in the motor operator with an output mechanism mechanically coupled to the movable contact;

the motor operator also having a potentiometer mechanically coupled to the motor output mechanism, the potentiometer producing an electrical position signal indicating an extent of movement of the motor output mechanism;

the motor and the potentiometer being housed in an enclosure with externally extending conductors for supplying electrical power to the motor and the potentiometer and for communicating the position signal produced by the potentiometer;

the motor output mechanism having a portion extending out of the enclosure for mechanical coupling to the movable switch contact;

the enclosure of the motor and the potentiometer being substantially continuous on all sides with no access port for interior adjustment.

29. The combination of claim 28 where:

the potentiometer is a rotary potentiometer.

30. The combination of claim 29 where:

the rotary potentiometer is coupled to a motor shaft that is part of the motor output mechanism.

31. The combination of claim 30 where:

the rotary potentiometer is coupled to the motor shaft through a slip clutch.

32. The combination of claim 31 where:

the slip clutch comprises a number of o-rings around an end of a rotary shaft of the potentiometer and the shaft end with o-rings is fit within an axial bore in an end of the motor shaft.

33. The combination of claim 30 where:
the motor output mechanism also includes a gear train within the enclosure between the motor shaft and an output shaft extending out of the enclosure.

34. The combination of claim 33 where:
the enclosure comprises a wall structure of continuous metal walls of a first thickness, with open ends, and first and second metal end caps of a second, greater, thickness in a close fitting relation to the open ends of the wall structure; and
the motor, motor shaft, gear train, and rotary potentiometer are all supported together on one end cap and the output shaft is supported on and extends out from both end caps.

35. The combination of claim 34 where:
the enclosure and power switch are together at an underground location; and
the conductors from the enclosure extend to an above ground location.

36. The combination of claim 33 where:
the motor has an overspeed brake circuit within the enclosure and connected across an armature of the motor.

37. A power switch motor operator system comprising:
a motor drive with a rotary output shaft adapted for coupling with an underground or pad mounted power switch;
a position sensor arranged to sense a rotary position of a motor in the motor drive and to generate an electrical signal representing the sensed position;
a housing containing the motor drive and the position sensor from which the rotary output shaft extends;
a control and power supply assembly connected to supply power to the motor drive in accordance with sensed position signals from the position sensor without other electrical signals from the motor drive; and
means for setting and adjusting, at a location outside of the housing of the motor and the position sensor, travel limits of the motor in the motor drive using position signals from the position sensor.

38. The motor operator system of claim 37 where:
the position sensor is characterized by an ability to resume generating an accurate position signal upon restoration of power following a loss of power to the motor drive.

39. The motor operator system of claim 37 where:
the motor drive includes a motor with an armature having an overspeed brake circuit connected thereacross; and
the overspeed brake circuit comprises a bidirectional overvoltage suppressor that becomes conductive at a threshold voltage generated in the armature and the threshold voltage is above the normal operating voltage of the motor.

40. The motor operator system of claim 38 where:
the position sensor is a rotary potentiometer that operates on a potentiometer shaft, through a slip clutch, by rotation from a shaft from the motor.

41. The motor operator system of claim 38 where:
the rotary output shaft also has an extension from the housing for manually turning the motor drive.

42. The motor operator system of claim 37 where:
the control and power supply assembly is located elsewhere than within the housing containing the motor drive and the position sensor.

43. The motor operator system of claim 38 where:
the means for setting and adjusting travel limits comprises a position switch panel that is part of the control and power supply assembly.

44. The motor operator system of claim 38 where:
the housing of the motor drive and the position sensor comprises an open-ended wall structure, with a substantially square cross-section, of continuous metal walls of a first thickness and first and second metal end caps of a second, greater, thickness in a tight fitting relation to respective ends of the wall structure; and
the motor drive and position sensor are supported on one or both end caps without direct contact with the wall structure.

45. The motor operator system of claim 43 in combination with a power switch where:
the power switch is selected from the group consisting of vacuum switches, gas insulated switches, and enclosed air break switches; and
the housing of the motor drive and the position sensor is located adjacent the power switch with the rotary output shaft of the motor drive coupled to a switch operating mechanism.

46. A motor operator system for a power switch comprising:
a motor drive adapted for coupling with an underground or pad mounted power switch by a mechanical output;
a position sensor arranged to sense a position of a motor in the motor drive and generate an electrical signal representing the sensed position;
a housing containing the motor drive and the position sensor from which the mechanical output extends;
a control and power supply assembly connected to supply power to the motor drive in accordance with sensed position signals from the position sensor without other sensed signals from the motor, and
means for setting and adjusting, at a location outside of the housing of the motor and the position sensor, travel limits of the motor in the motor drive using position signals from the position sensor.

47. The motor operator system of claim 46 where:
the position sensor is characterized by an ability to resume generating an accurate position signal upon restoration of power following a loss of power to the motor drive.

48. The motor operator system of claim 46 where:
the position sensor is a rotary potentiometer.

49. The motor operator system of claim 46 where:
the control and power supply assembly, as well as the means for setting and adjusting, comprises elements located outside of the housing of the motor drive and the position sensor with conductive interconnections therebetween.

50. The motor operator system of claim 49 where:
the housing of the motor drive and the position sensor is at least substantially all metal.

51. The motor operator system of claim 46 in combination with a power switch where:
the power switch is one that has a switch operating mechanism to which the mechanical output of the motor drive is coupled.

52. The motor operator system of claim 49 in combination with a power switch where:
the power switch and the housing for the motor drive and position sensor are located in an underground vault;
the means for setting and adjusting comprise elements in a portable unit with conductive connection to the motor drive and with a pair of conductors respectively connectable across a battery.

53. A power switch and motor operator system in a combination comprising:

a power switch;

a motor drive in a housing with a rotatable output shaft adapted for coupling with the power switch;

a position sensor in the housing with the motor drive and arranged to sense a rotary position of an element in the motor drive and to generate an electrical signal representing the sensed position;

the position sensor being characterized by an ability to resume generating an accurate position signal upon restoration of power following a loss of power to the motor drive;

a controller, located outside of the housing of the motor drive and the position sensor, that utilizes the position signal, without other sensed signals from the motor drive, for operating the motor drive within predetermined travel limits; and the controller comprises a hand-holdable unit, with conductive connection to the motor drive and with a pair of conductors respectively connectable to a source of power, having a position switch panel for setting and adjusting travel limits of the motor in the motor drive using a position signal from the position sensor.

54. The combination of claim 53 where:

the position sensor is a rotary potentiometer coupled to a motor shaft in the motor drive; and the power switch and the housing of the motor drive and the position sensor are in an underground vault and the hand-holdable unit is operable at an above ground location.

55. A motor operator system, for a power switch, comprising:

an electrically energized motor drive with an output shaft having a coupler for a power switch and also having a means for manually operating the motor drive;

the motor drive including a motor; and an overspeed brake circuit connected across the motor that creates braking action at a threshold speed greater than the motor speed occurring during normal operation with its electrical energization.

56. The system of claim 55 further comprising:

a dynamic braking circuit connected with the motor that brakes the motor at a stopping point of travel.

57. The system of claim 56 where:

the motor is a DC motor with an armature and the overspeed brake circuit comprises a bi-directional overvoltage suppressor that clamps the voltage across the armature at the threshold speed.

58. The system of claim 56 further comprising:

a potentiometer arranged to sense a rotary position of the motor and to generate an electrical signal representing the sensed position;

a housing containing the motor drive and the potentiometer; and means for setting and adjusting, at a location outside of the housing, travel limits of the motor using the position signals from the position sensor, where the travel limits include the stopping point of travel at which the dynamic braking circuit brakes the motor.

59. An underground power switch installation comprising:

a power switch and a motor-gearbox for operating the power switch with mechanical coupling therebetween;

the power switch and the motor-gearbox being located in an underground vault;

the motor-gearbox including a motor with a motor shaft and also a position sensor arranged to produce an electrical signal of varying magnitude indicative of the motor shaft's rotary position;

a portable controller that is connected with the motor-gearbox to receive the electrical signal from the position sensor, the portable controller having a size a worker can hold and use to perform, while outside of the underground vault, power switch and motor operations and setting and adjusting travel limits of the motor using the electrical signal from the position sensor.

60. The installation of claim 59 where:

the portable controller also has leads for temporary connection by the worker to a power source outside of the underground vault.

61. The installation of claim 59 further comprising: a power supply located in the underground vault that is connected to supply power to the motor-gearbox and is also connected to the portable controller.

62. The installation of claim 61 where:

the power supply and the motor-gearbox are in separate sealed and electrically interconnected enclosures.

63. The installation of claim 61 where:

the power supply and the elements of the motor-gearbox are within a single sealed enclosure.

* * * * *